May 1, 1951 J. E. BECKER 2,550,664
FLUID CIRCULATION CONTROL FOR ROTARY HYDRAULIC COUPLINGS
Filed March 17, 1948
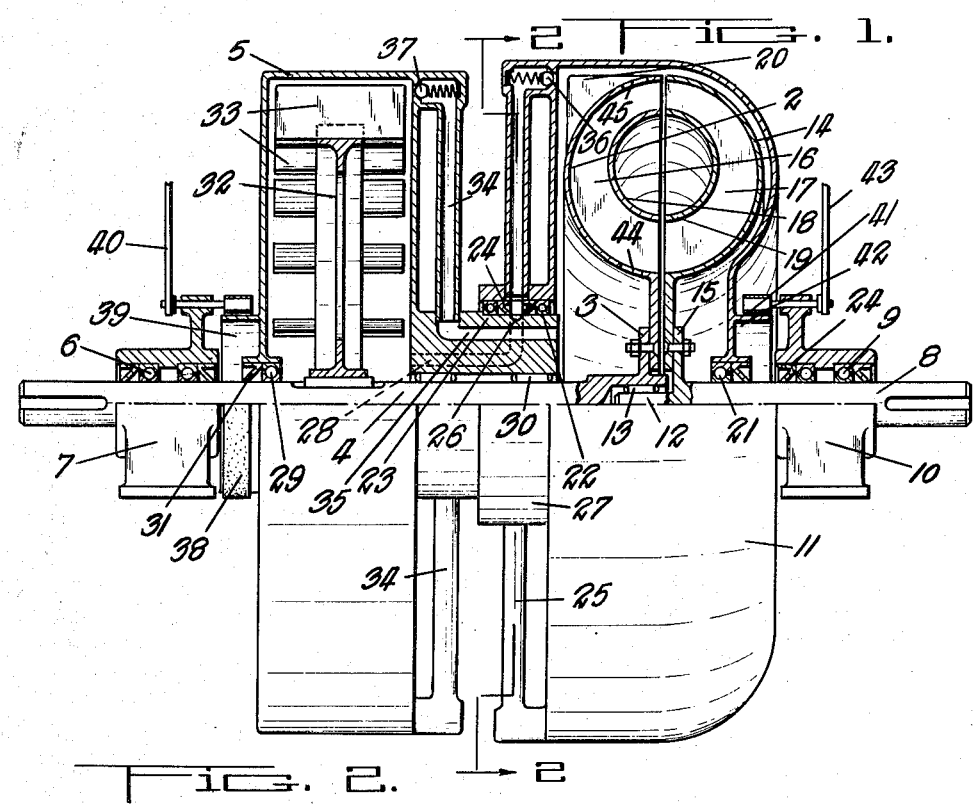
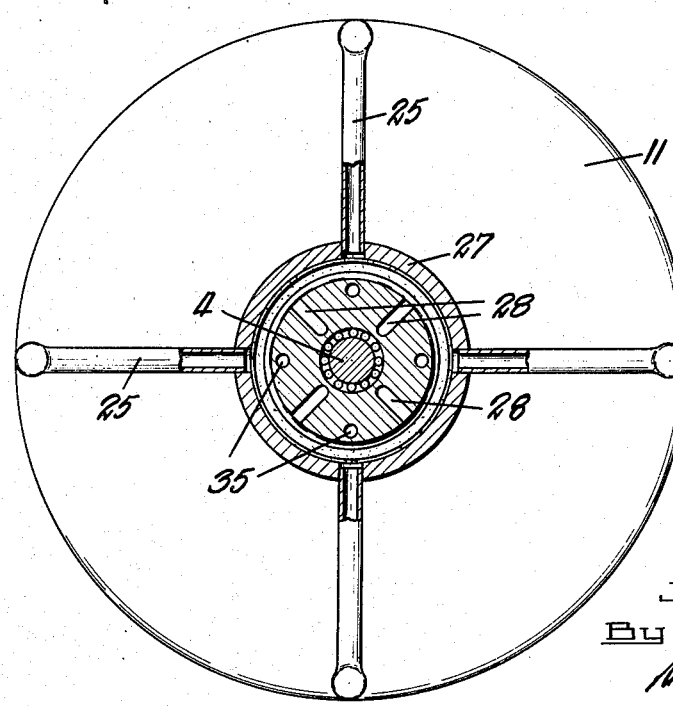
Inventor
JOHN E. BECKER
By
Attorney Patented May 1, 1951

2,550,664

UNITED STATES PATENT OFFICE 2,550,664

FLUID CIRCULATION CONTROL FOR ROTARY HYDRAULIC COUPLINGS

John Edward Becker, Darlington Township, Ontario, Canada, assignor to Atlas Polar Company Limited, Toronto, Ontario, Canada, a corporation of Canada Application March 17, 1948, Serial No. 15,353

4 Claims. (Cl. 60—54)

The invention relates to improvements in Fluid Circulation Controls for Rotary Hydraulic Couplings and is a continuation-in-part of my patent application Serial Number 744,000, filed April 25, 1947, now Patent No. 2,539,004, wherein I disclosed a coupling housing containing an impeller and a runner, the housing being normally free to rotate with the impeller, and the impeller furnished with centrifugal pump vanes and a braking mechanism provided to govern the rotative speed of the housing and establish a speed differential between the centrifugal pump vanes and the housing, with a resultant pumping action to remove fluid from the coupling.

The object of the present invention is to provide a fluid reservoir which is rotatable in conjunction with the coupling housing and provided to receive fluid pumped from the coupling housing and also to supply fluid to the coupling housing; the reservoir containing a paddle or turbine wheel secured to and rotating with the driving shaft and provided to centrifugally pump fluid from the reservoir into the coupling housing.

With the foregoing and other objects in view as shall hereinafter appear, my invention consists of a fluid circulation control for fluid couplings constructed and arranged all as hereinafter more particularly described and illustrated in the accompanying drawing in which:

Fig. 1 is a side elevational view of the coupling and reservoir assembly, the upper portion thereof being shown in section, and Fig. 2 is a transverse cross-sectional view taken through the line 2—2, Fig. 1.

Like characters of reference indicate corresponding parts in the different views of the drawing.

An impeller 2 of concave ring-shaped form is secured to a flange 3 on the inner end of a driving shaft 4 which extends through a rotatable fluid reservoir 5 and is carried by a ball race 6 mounted within a bracket 7 exteriorly of the reservoir 5. A driven shaft 8 is supported by a roller race 9 within a bracket 10 positioned exteriorly of the rotatable coupling housing 11 and through which the driven shaft 8 extends. The inner end of the driven shaft 8 has a reduced diameter portion 12 extending into a needle bearing 13 contained within the inner end of the driving shaft 4. The coupling housing 11 contains a concave ring-shaped runner 14 having its central portion attached to a flange 15 on the inner end of the driven shaft 8. The impeller 2 and runner 14 carry a plurality of the usual radial blades 16 and 17 and support the usual ring members 18 and 19, whereby passages for the fluid transmission of power are constituted.

The outer face of the impeller 2 carries a plurality of substantially radially positioned fins which act in the capacity of centrifugal pump vanes 20. The coupling housing 11 is shaped to follow the contour of the runner 14 and impeller 2 with its pump vanes 20.

The housing 11 is mounted for free rotation upon a pair of ball races; one race 21 being carried upon the driven shaft 8 and the other ball race 22 carried upon a rotatable hub 23 positioned between the reservoir 5 and the coupling housing 11. In order to prevent the escape of fluid from the coupling housing 11, seal rings 24 are furnished within the vicinity of the ball races 21 and 22. For the removal of fluid from the coupling housing 11, the housing is formed with a plurality of radially positioned conduits 25 extending from the peripheral portion of the coupling housing 11 to the hub 23. The hub 23 is formed with a groove 26 in its outer face which communicates with the ends of the conduits 25 contained within a rotatable closure collar 27. The groove 26 is in communication with a plurality of passages 28 which extend inwardly from the groove and longitudinally of the rotatable hub 23 to open into the rotatable reservoir 5. It will thus be understood that fluid may pass from the rotating coupling housing through the conduits 25 into the fluid reservoir 5.

The fluid reservoir 5 is secured to the hub 23 and rotates therewith. The reservoir 5 is mounted upon a roller bearing 29 carried by the driving shaft 4 and the rotatable hub 23 is mounted upon a pair of roller bearings 30 also mounted upon the driving shaft 4. A fluid seal ring 31 is adjacently positioned to the roller bearing 29.

Fluid is ejected from the reservoir 5 into the coupling housing 11 under the influence of a centrifugal pump which is in the form of a paddle or turbine wheel 32 contained within the reservoir 5 and keyed to the driving shaft 4. The turbine wheel 32 carries a plurality of radially extending vanes 33.

The reservoir 5 is formed with a plurality of radial conduits 34 which are directed inwardly from the peripheral portion of the inner wall of the reservoir 5 and each communicate with a passage 35 extending through the hub 23 and opening into the coupling housing 11. In order to prevent any possibility of fluid backing up from the reservoir 5 through the conduits 25 or from the coupling housing 11 through the conduits 34, ball check valves 36 and 37 are positioned in the outer ends of the conduits 25 and 34.

The independent rotative movement of the reservoir 5 and the coupling housing 11 may be controlled by any suitable brake arrangements. In the drawing I show a brake band 38 surrounding a flange 39 on the reservoir and actuated by a brake handle mechanism 40, and for the braking mechanism for the coupling housing 11, show a similar construction wherein a brake band 41 surrounds a flange 42 on the housing and is actuated by a brake handle mechanism 43. The impeller ring 2 is formed with a plurality of fluid inlet and fluid outlet orifices 44 and 45 whereby fluid may be injected into the impeller through the orifices 44 and bled therefrom through the orifices 45, as occasion demands.

Operation:

When the coupling is transmitting power from the driving shaft 4 to the driven shaft 8, fluid circulates between the impeller 2 and runner 14 in the usual manner. During the transmission of power a centrifugal fluid ring is formed within the coupling housing 11 exteriorly of the impeller 2, and the impeller 2, runner 14 and housing 11 with its fluid ring rotate in unison. As the turbine wheel 32 is secured to the driving shaft 4 it will rotate in unison with the impeller 2, and as the reservoir 5 is mounted for free rotation and also contains fluid, the centrifugal fluid ring formed by the vanes 33 of the turbine wheel 32 will cause the reservoir 5 to rotate at substantially the same speed as the turbine wheel.

If it is desired to remove a certain proportion, or all of the fluid, from the coupling housing 11, the brake 43 is applied, whereby the rotative speed of the coupling housing 11 is reduced or brought to a standstill. Immediately the rotative speed of the coupling housing falls below the rotative speed of the impeller ring 2 with its pump vanes 20, such vanes will pump fluid from the housing 11 through the radial conduits 25 and passages 28 into the reservoir 5.

When it is desired to inject fluid from the rotating reservoir 5 into the coupling housing 11 this may be quickly accomplished by application of the brake 40, whereby the rotative speed of the reservoir 5 will be reduced. The speed differential between the turbine wheel 32 and the reservoir 5 will cause the vanes 33 to act in the capacity of a centrifugal pump and eject fluid from the reservoir 5 through the conduits 34 and passages 35 into the coupling housing 11.

From the foregoing description it will be apparent that any desired speed ratio between the driving shaft 4 and driven shaft 8 may be obtained through manipulation of either one or both of the brakes 40 and 43, and as the fluid in the reservoir 5 may be rapidly pumped therefrom into the coupling housing 11 that a fluid reservoir of relatively small capacity need only be provided, and although I have shown and described a particular object of my invention, it is to be understood that I may make any such changes or alterations that may afterwards seem desirable, without departing from the spirit of my invention as set forth in the appended claims.

What I claim as my invention is:

1. In a fluid coupling, the combination with a rotatable impeller blade assembly and a rotatable runner blade assembly adapted to be driven by the impeller blade assembly through the medium of a fluid, of a plurality of centrifugal pump vanes rotatable concentrically with the impeller blade assembly and provided to pump fluid from the coupling, a fluid containing rotatable housing in which the impeller blade assembly and runner blade assembly are contained and which is free to rotate independently of the impeller blade assembly, brake means for controlling the rotation of the impeller housing, a fluid reservoir mounted to rotate independently of the impeller housing and to contain a centrifugally formed fluid ring therein, a fluid outlet extending from the impeller housing to the rotatable reservoir, a fluid inlet extending from the rotatable reservoir to the impeller housing, a centrifugal pump wheel contained within the rotatable reservoir and coupled to the impeller blade assembly to rotate therewith, and means for retarding the rotative speed of the reservoir to secure a speed differential between the centrifugal pump wheel and the rotatable reservoir.

2. A fluid coupling as claimed in claim 1, wherein the impeller blade assembly is in the form of a ring having a plurality of fluid inlet orifices in its inner circumference and a plurality of fluid outlet orifices in its outer circumference, the centrifugal pump vanes being mounted upon the outer circumference of the ring adjacent to the fluid outlet orifices.

3. A fluid coupling as claimed in claim 1, wherein the impeller blade assembly is carried upon a driving shaft, and wherein the rotatable reservoir is mounted for free rotation about the driving shaft.

4. A fluid coupling as claimed in claim 1, wherein the impeller blade assembly is carried upon a driving shaft and wherein the rotatable reservoir is mounted for free rotation about the driving shaft and the centrifugal pump wheel is secured to the driving shaft.

JOHN EDWARD BECKER.

REFERENCES CITED

The following references are of record in the file of this patent:

UNITED STATES PATENTS

| Number | Name | Date |
| --- | --- | --- |
| 1,859,607 | Sinclair | May 24, 1932 |
| 1,910,696 | Kiep | May 23, 1933 |
| 1,938,357 | Sinclair | Dec. 5, 1933 |
| 1,975,505 | Föttinger | Oct. 2, 1934 |
| 2,343,786 | Martin | Mar. 7, 1944 |